United States Patent [19]
Nohara

[11] Patent Number: 5,936,769
[45] Date of Patent: *Aug. 10, 1999

[54] REFLECTING SHEET

[75] Inventor: Koji Nohara, Tokyo, Japan

[73] Assignee: Japan Invention Spread Promotion Association Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/666,281
[22] PCT Filed: Oct. 6, 1995
[86] PCT No.: PCT/JP95/02051
  § 371 Date: Jun. 5, 1996
  § 102(e) Date: Jun. 5, 1996
[87] PCT Pub. No.: WO96/11303
  PCT Pub. Date: Apr. 18, 1996

[30] Foreign Application Priority Data

Oct. 7, 1994 [JP] Japan ..................................... 6-270311
Feb. 4, 1995 [JP] Japan ..................................... 7-38996

[51] Int. Cl.⁶ .................................................. G02B 5/122
[52] U.S. Cl. .......................................... 359/529; 359/530
[58] Field of Search ...................................... 359/529–533, 359/833–834

[56] References Cited

U.S. PATENT DOCUMENTS 2,685,231 12/1954 Onksen ..................................... 359/533
5,237,449 8/1993 Nelson et al. ........................... 359/529

FOREIGN PATENT DOCUMENTS 62-17721 4/1987 Japan .
2-250083 10/1990 Japan .

*Primary Examiner*—James Phan
*Attorney, Agent, or Firm*—Nath & Associates; Gary M. Nath; Harold L. Novick

[57] ABSTRACT

A reflecting sheet which comprises a transparent sheet capable of reflection by its reverse, said transparent sheet having the face which is partly or entirely constructed of a plurality of composite surfaces, each being a combination of a cylindrical surface inclined in one direction only and a curved or flat surface inclined in the opposite direction, said composite surfaces being contiguous or intermittent with a flat surface interposed between and being constructed such that a large part of their surface area is accounted for by the cylindrical surfaces, and also having the reverse which is constructed of a plurality of contiguous corner-cube prisms.

1 Claim, 13 Drawing Sheets

REFLECTING SHEET

TECHNICAL FIELD

The present invention relates to a reflecting sheet and a reflecting plate to be used for road signs, information boards, and reflectors. (In the present invention, the term "reflection" embraces "retroreflection".)

BACKGROUND ART

Road signs, information boards, and reflectors for safety and security are provided with reflecting sheets or plates (collectively referred to as "reflecting sheet" hereinafter), which employ glass beads or corner-cube prisms as the reflecting elements. Unfortunately, these reflecting elements have drawbacks in their reflecting characteristics as explained below. They do not meet industrial standards if they are used as such for reflecting sheets.

The disadvantage of glass beads as reflecting elements is that they do not accomplish complete reflection on account of spherical aberration inherent in spherical lens. FIG. 12 shows the optical paths of incident rays and reflected rays of a glass bead (3) whose focal length is equal to its curvature radius. Judging from the focal length, the luminous flux of all incident rays should converge at point P on the reflection surface of the bead (3). In actual, however, this is not the case due to spherical aberration, as shown in the diagram of light paths. The resulting reflection is diffuse reflection, with incident rays reflected in all directions. This is the reason for the low luminance of reflected rays from glass beads. Therefore, the conventional reflecting sheets do not fully meet requirements for luminance.

The disadvantage of corner-cube prisms as reflecting elements is that their reflection with high luminance is highly directional. This is due to the fact that incident rays are reflected twice in the prism and there is very little difference between the angle of incidence and the angle of reflection. In other words, the reflected rays from the prism are visible only for a person standing close to the light source, and the luminance of reflected rays is very low at the optical path deflected (by several degrees) from the light source. Moreover, the fact that the luminance of reflected rays is extremely high for a person standing near the light source makes corner-cube prisms unsuitable for use on information boards. (In other words, information boards with corner-cube prisms would be dazzling for observers near the light source.)

For this reason, reflecting sheets provided with corner-cube prisms as reflecting elements do not meet the industrial standards (such as JIS) which stipulate the luminance at different angles of observation, and hence they are seldom used for road signs and information boards.

It is an object of the present invention to provide a reflecting sheet which permits reflection with higher luminance than the conventional reflecting sheets with glass beads and which fully meets various industrial standards.

DISCLOSURE OF THE INVENTION

The first aspect of the present invention resides in a reflecting sheet which comprises a transparent sheet capable of reflection by its reverse, said transparent sheet having the face which is partly or entirely constructed of a plurality of contiguous cylindrical surfaces (1), each having the identical or different curvature radius, and also having the reverse which is constructed of a plurality of contiguous corner-cube prisms (2). Each cylindrical surface (1) corresponding to the plane of incidence of each corner-cube prism is inclined in one direction only, as shown in FIGS. 1 to 5.

The second aspect of the present invention resides in a reflecting sheet which comprises a transparent sheet (of synthetic resin) capable of reflection by its reverse, said transparent sheet having the face which is partly or entirely constructed of a plurality of contiguous composite surfaces (1), each being a combination of a cylindrical surface inclined in one direction only and a curved or flat surface inclined in the opposite direction (as shown in FIGS. 16 to 20), said composite surfaces (1) being constructed such that a large part of their surface area is accounted for by the cylindrical surfaces, and also having the reverse which is constructed of a plurality of contiguous corner-cube prisms (2).

The functions of the present invention are as follows:

The reflecting sheet of the present invention has the incident surface as defined in the claims, and this incident surface is constructed such that the luminous flux reflected from the corner-cube prisms proceeds only in the direction normal to the reflecting sheet, as shown in FIGS. 9 and 10. The reflected rays in the confined light paths have adequate diffuse reflection characteristics. Reflection in this manner minimizes the undesirable loss of reflected rays due to diffuse reflection. Thus it is possible to rectify the strong directivity of reflective luminous flux, which is a drawback of corner-cube prisms, and to produce a desirable reflection which meets the requirements (reflection luminance at specified angles) stipulated in JIS and other standards.

The reflecting sheet of the present invention performs reflection as indicated by the optical paths shown in FIG. 15. Light emanating from a light source impinges upon the cylindrical surface (1), which is the plane of incidence of the reflecting sheet of the present invention. The incident rays enter the corner-cube prism (2) after slight refraction at the point (j) of incidence. They are then reflected at a point (k) on the first reflecting surface of the corner-cube prism (2). They are reflected again at a point (1) on the second reflecting surface of the corner-cube prism (2). Finally, they are refracted at a point (m) on the cylindrical surface (1). Thus the angle of reflection differs from the angle of incidence, and this produces the effect of diffuse reflection.

The difference between the angle of incidence and the angle of reflection is determined by the difference between the slope at point (j) of incidence on the cylindrical surface (1) and the slope at point (m) on the cylindrical surface (1) through which the reflected rays pass. The difference of angle mentioned above can be obtained from the equation below which is applied to point (j) of incidence and point (m) of refraction shown in FIG. 14.

$$n \times \sin i = n' \times \sin i'$$

where:
n is the refractive index of air,
n' is the refractive index of the synthetic resin from which the reflecting sheet of the present invention is formed,
i is the angle between the incident ray and the normal at point (p) of incidence on the interface, and
i' is the angle between the refracted ray and the normal.

The effect of diffuse reflection produced by the reflecting sheet of the present invention is most significant when the incident rays are close to the normal (s–s') which corresponds to the optical axis of the cylindrical surface (1), and it is least significant when the incident rays are away from the optical axis, as shown FIG. 15. In the latter case, the light passes along the line o-q-r-t, and there is very little difference between the slope at point (o) and the slope at point (t) on the cylindrical surface (1).

The diffuse reflection mentioned above takes place evenly throughout the surface of the reflecting sheet. Therefore, the reflected light from the reflecting sheet of the present invention is almost uniform for observers irrespective of angles with the reflecting sheet. Such diffuse reflection is more desirable than the reflection by conventional corner-cube prisms which has a high luminance only at the angle of view close to 0°.

BEST MODE FOR CARRYING OUT THE INVENTION

Figure 1:
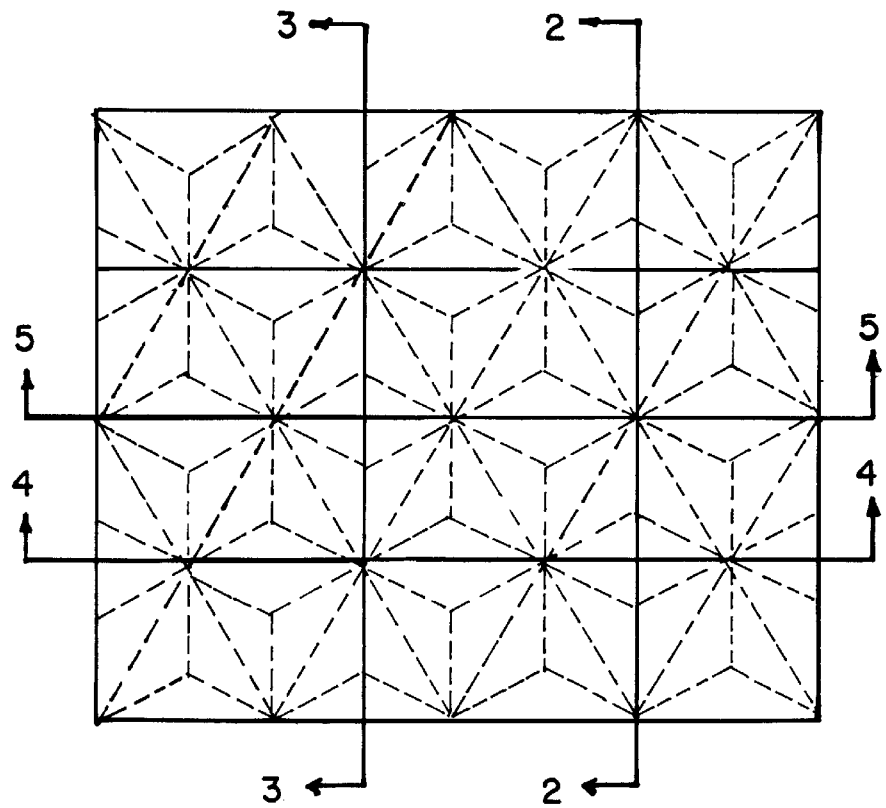
FIG. 1 is a front view of the first embodiment of the present invention.
Figure 2:
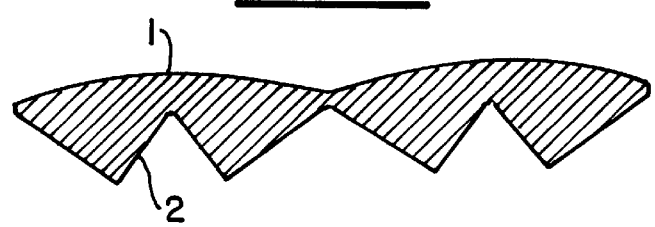
FIG. 2 is a sectional view taken along the line A–A' in FIG. 1.
Figure 3:
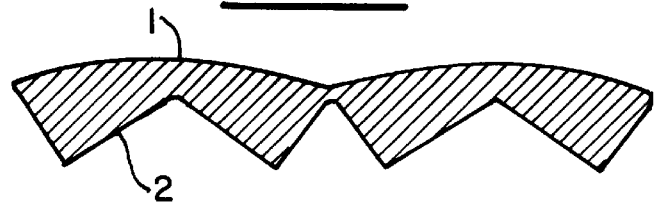
FIG. 3 is a sectional view taken along the line B–B' in FIG. 1.
Figure 4:
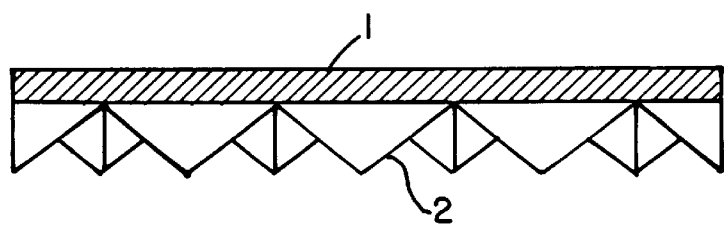
FIG. 4 is a sectional view taken along the line C–C' in FIG. 1.
Figure 5:
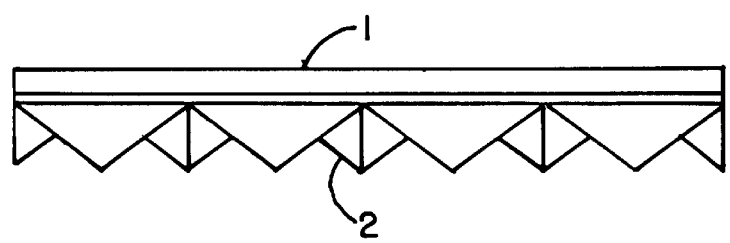
FIG. 5 is a sectional view taken along the line D–D' in FIG. 1.
Figure 8:
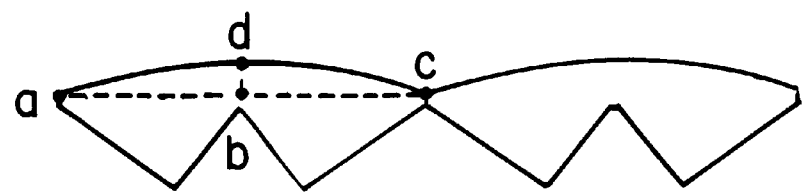
FIG. 8 is a diagram to explain the positional relationship between the cylindrical surface (1) and the corner-cube prism (2) in the first embodiment of the present invention.
Figure 9:
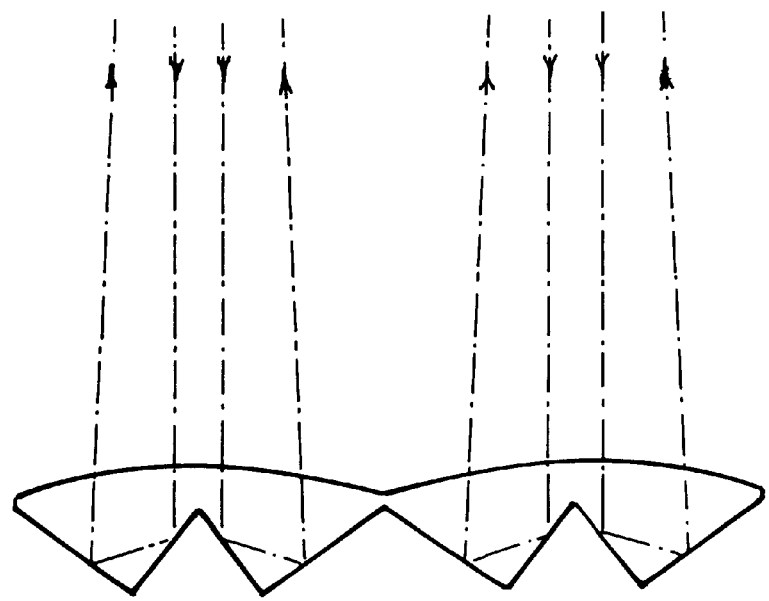
FIG. 9 is a diagram of optical paths which is designed to explain the diffuse reflection characteristics of light as viewed in the sectional direction in FIG. 2.
Figure 10:
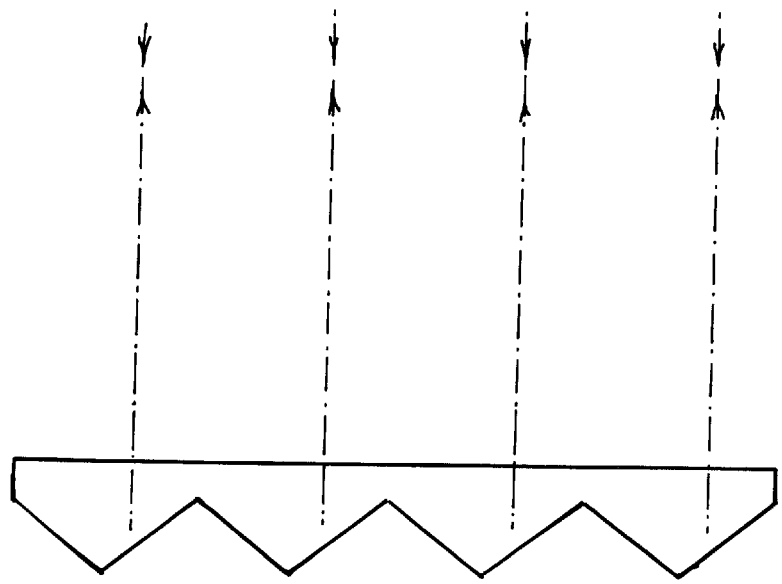
FIG. 10 is a diagram of optical paths which is designed to explain the diffuse reflection characteristics of the luminous flux of incident and reflected rays in FIG. 9 as viewed from the sectional direction in FIG. 4.

The reflecting sheet as the first embodiment of the present invention is a transparent sheet made of polyester resin. The transparent sheet has a reflecting surface on its reverse and also has a compensating curved surface on its face. The curved surface is designed to produce diffuse reflection within a reflection angle of about 2°. As shown in FIG. 8, the curved surface is a cylindrical surface which is defined such that the distance between point a and point b is 130 μm, the distance between point b and point c is 130 μm, and the distance between point b and point d is 12 μm, and the curvature radius is 625 μm. The cylindrical surface (1) is formed in series in the vertical direction as shown in FIGS. 1 to 5. On the reverse of the transparent sheet are formed corner-cube prisms (2) which are contiguous to one another. Each corner-cube prism has the plane of incidence of a regular triangle whose one side is 150 μm long. The relative position of the cylindrical surface (1) and the corner-cube prism (2) is such that the former is inclined in only one direction with respect to the plane of incidence of the latter, as shown in FIGS. 2 and 3.

The reflecting sheet constructed as mentioned above is completed by plating its reverse with aluminum to form the reflecting surface. It is cut into a desired shape (letter or logo) and pasted up on a base for an information board.

In cutting and pasting the reflecting sheet, care should be taken that the contiguous cylindrical surfaces (l) run in the vertical direction, because the reflecting sheet possesses the directional property for reflection.

It is possible to impart a desired color to the reflecting sheet by preparing it from a dyed (or pigmented) transparent polyester. This object is also achieved by printing (such as screen printing) with a transparent ink. In this case the thickness of the printing layer should be taken into account in establishing the curvature radius of the cylindrical surface (1).

Figure 11:
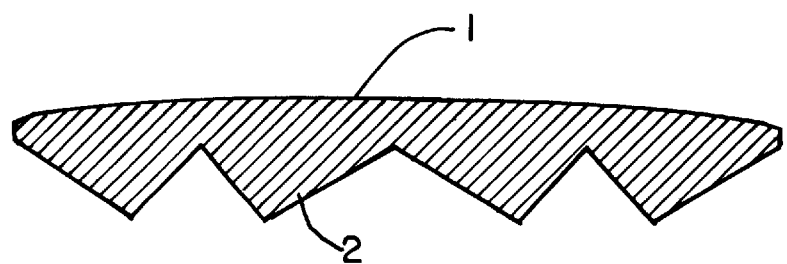
FIG. 11 is a sectional view to illustrate the second embodiment of the present invention.
Figure 12:
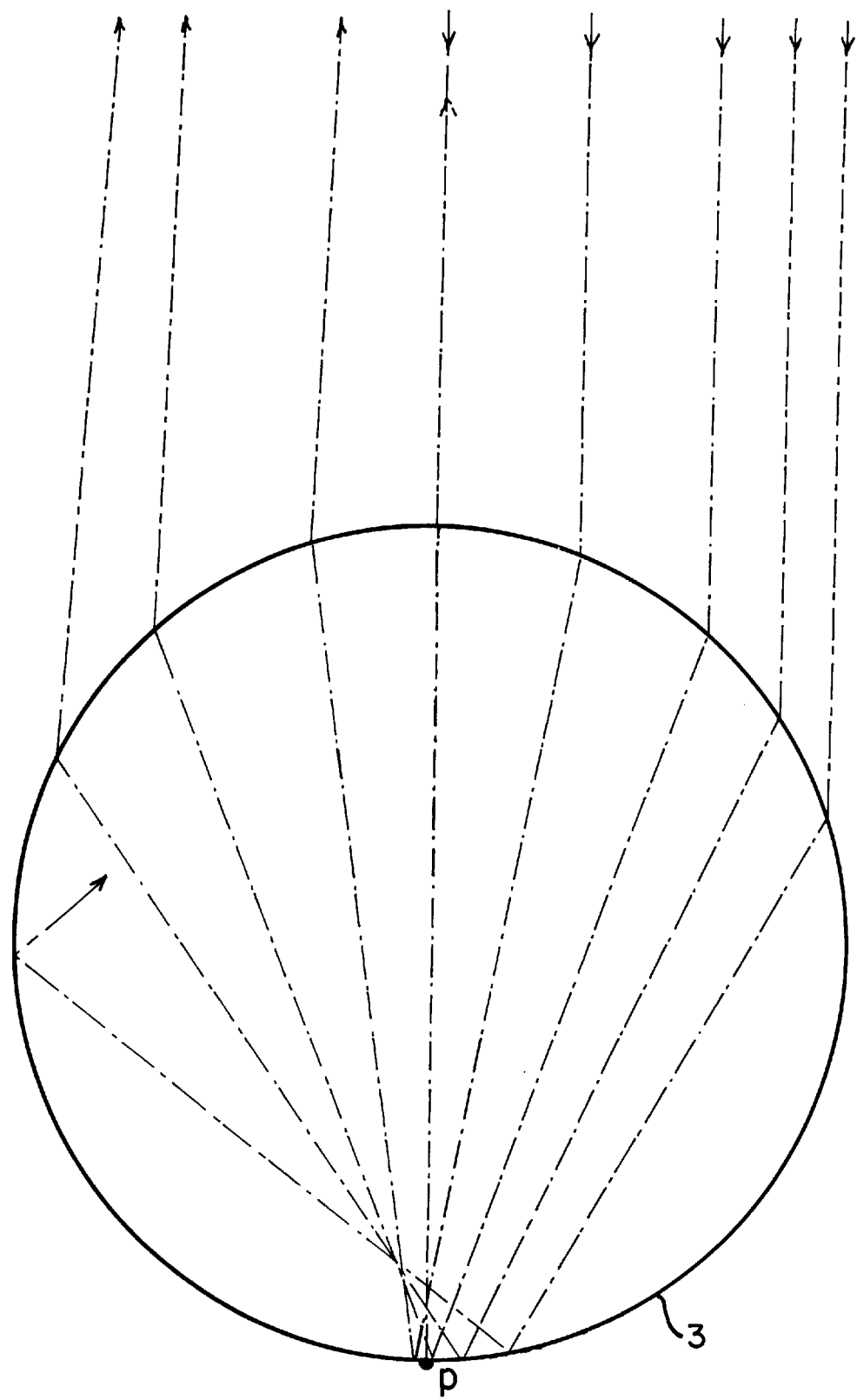
FIG. 12 is a diagram of optical paths to illustrate the reflection characteristics of a glass bead (3).

The cylindrical surface (1) on the reflecting sheet may be formed such that it covers an even number (e.g., 4 or 6) of corner-cube prisms (2) as shown in FIG. 11. In this way it is possible to form a large cylindrical surface, and this contributes to easy and accurate molding. The curvature radius of the cylindrical surface (1) varies depending on the number of corner-cube prisms it covers and should be established accordingly so that it produces the desired diffuse reflection.

The curvature radius of the cylindrical surface (1) on the reflecting sheet may be the same throughout or may vary locally. In the former case, the reflecting sheet will reflect light almost uniformly in the vertical plane. In the latter case, the reflected light from the reflecting sheet will vary in intensity depending on the direction of reflection.

In actual, there would be an instance where the corner-cube prisms (2) cannot be molded with theoretical accuracy. In such a case, diffusion by the cylindrical surface (1) will be greater than designed and there would be some diffusion even though the plane of incidence of the corner-cube prism is flat (4).

Figure 13:
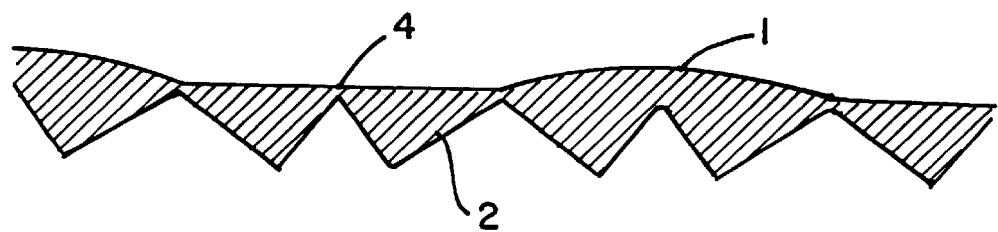
FIG. 13 is a sectional view to illustrate the plane of incidence in the embodiment of the present invention which has both the cylindrical surface (1) and the flat surface (4).
Figure 14:
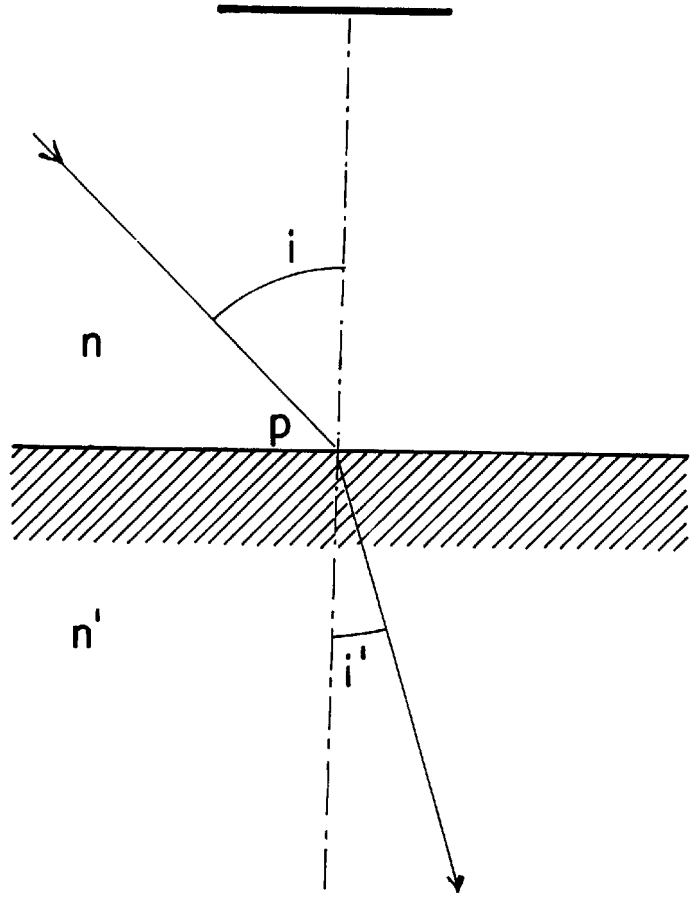
FIG. 14 is a diagram to explain the equation $n \times \sin i = n' \times \sin i'$.
Figure 15:
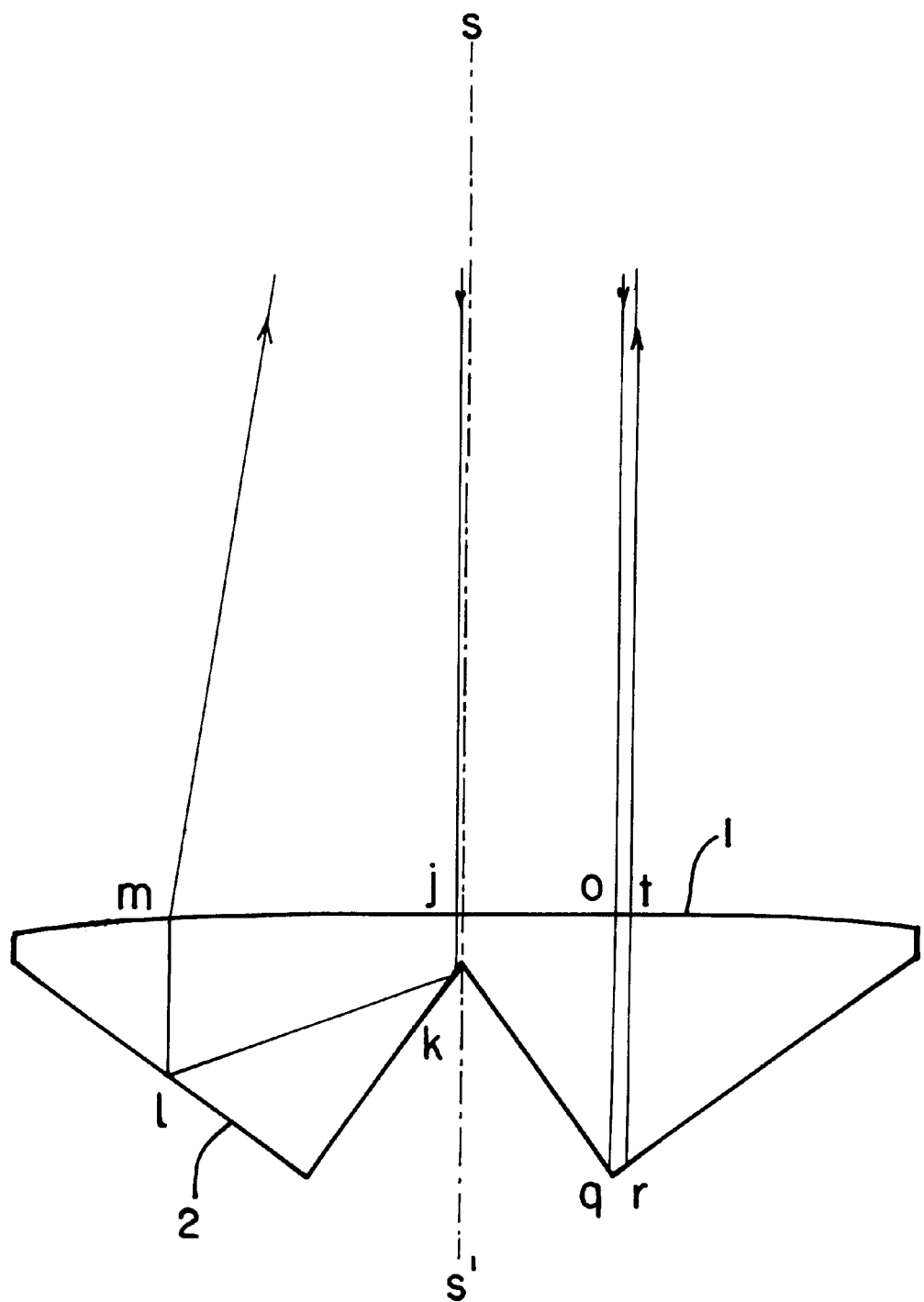
FIG. 15 is a diagram of optical paths to illustrate the effect of diffuse reflection in the present invention.

This situation may be avoided to obtain the desired diffuse reflection characteristics, if molding errors are taken into account when the curvature radius of the cylindrical surface (1) is established or if the cylindrical surface (1) is properly combined with the flat surface (4) as shown in FIG. 13.

The effect of the present invention remains the same even though the cylindrical surface (1) is concave (as in the third embodiment shown in FIGS. 18 and 19) instead of convex, so long as the curvature radius is identical.

The second embodiment of the present invention illustrated in FIG. 11 is a reflecting sheet (in the form of plate) made of synthetic resin such as polycarbonate and acrylic. The reflecting plate is composed of cylindrical surfaces (1) and corner-cube prisms (2), as shown in FIG. 8. The cylindrical surface (1) is defined such that the distance between point a and point b is 1300 $\mu$m, the distance between point b and point c is 1300 $\mu$m, and the distance between point b and point d is 137 $\mu$m, and the curvature radius is 6253 $\mu$m. The corner-cube prism (2) is defined such that one side of the regular triangle forming the angle of incidence is 1500 $\mu$m.

The reflecting sheet constructed as mentioned above is completed by plating its reverse with aluminum to form the reflecting surface. It is used as such as reflectors attached to the guardrail or installed in the dividing strip or cut into a proper size and pasted up or screwed up on cells.

In fixing the reflecting plate to cells, care should be taken that the contiguous cylindrical surfaces (1) run in the vertical direction, because the reflecting plate possesses the directional property for reflection.

It is possible to impart a desired color to the reflecting plate by preparing it from a dyed (or pigmented) transparent acrylic resin or other synthetic resin.

In actual, there would be an instance where the corner-cube prism (2) cannot be molded with theoretical accuracy. In such a case, diffusion by the cylindrical surface (1) will be greater than designed and there would be some diffusion even though the plane of incidence of the corner-cube prism is flat (4).

This situation may be avoided to obtain the desired diffuse reflection characteristics, if molding errors are taken into account when the curvature radius of the cylindrical surface (1) is established or if the cylindrical surface (1) is properly combined with the flat surface (4) as shown in FIG. 13.

Figure 6:
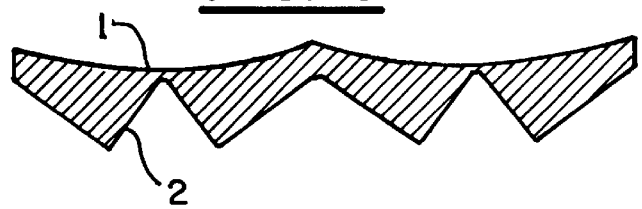
FIG. 6 is a sectional view of the first embodiment of the present invention in which the convex cylindrical surface (1) shown in section in FIG. 2 is replaced by the concave cylindrical surface (1).
Figure 7:
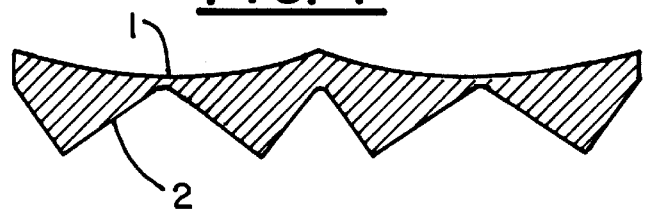
FIG. 7 is a sectional view of the first embodiment of the present invention in which the convex cylindrical surface (1) shown in section in FIG. 3 is replaced by the concave cylindrical surface (1).

The effect of the present invention remains the same even though the cylindrical surface (1) is concave as shown in FIGS. 6 and 7 instead of convex, so long as the curvature-radius is identical.

The third embodiment of the present invention is a reflecting sheet as shown in FIGS. 1, 4, 5, and 16. It is a transparent sheet, about 40 $\mu$m thick, molded from polyester resin. It has a reflecting surface on its reverse. The face of the reflecting sheet is composed of contiguous composite surfaces. Each composite surface is a combination of a cylindrical surface having a curvature radius of 625 $\mu$m and a curved surface. The cylindrical surface is inclined in one direction and the curved surface is inclined in the opposite direction. The reverse of the reflecting sheet is composed of contiguous corner-cube prisms (2), the plane of incidence of which is a regular triangle having sides 150 $\mu$m long. The face and reverse of the reflecting sheet are formed at one time by embossing. The face is formed such that the surface area of the cylindrical surface accounts for a large part of the surface area of the composite surface (1), and each composite surface (1) covers two corner-cube prisms (2), as shown in FIGS. 1, 4, 5, 16, and 17.

The reflecting sheet constructed as mentioned above is completed by plating its reverse with aluminum to form the reflecting surface. It is cut into a desired shape (letter or logo) and pasted up on a base for an information board.

In cutting and pasting the reflecting sheet, care should be taken that the cylindrical surfaces are inclined downward (as viewed from front), because the reflecting sheet possesses the directional property for reflection.

It is possible to impart a desired color to the reflecting sheet by preparing it from a dyed (or pigmented) transparent polyester. This object is also achieved by printing (such as screen printing) with a transparent ink. In this case the thickness of the printing layer should be taken into account in establishing the curvature radius of the cylindrical surface.

Figure 20:
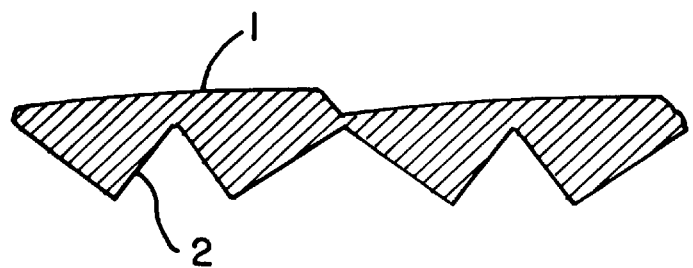
FIG. 20 is a sectional view of the third embodiment of the present invention in which the composite surface (1) is a combination of a cylindrical surface and a flat surface.
Figure 21:
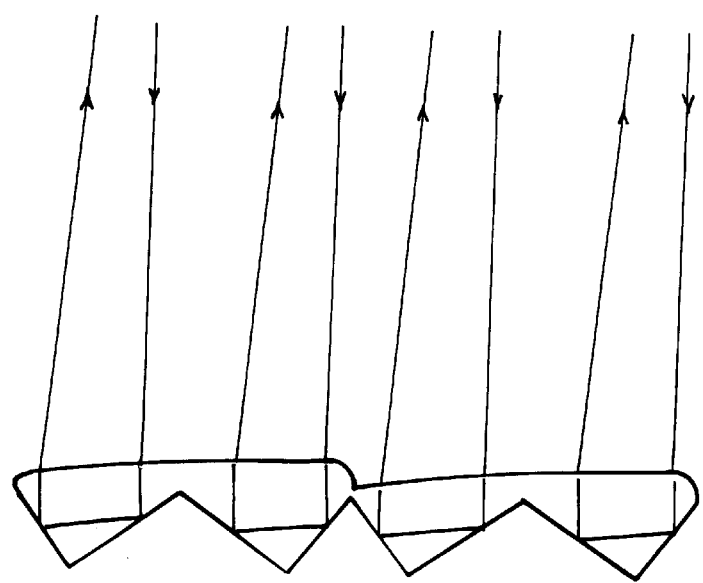
FIG. 21 is a diagram of optical paths which is designed to explain the diffuse reflection characteristics of light as viewed in the sectional direction in FIG. 16.
Figure 22:
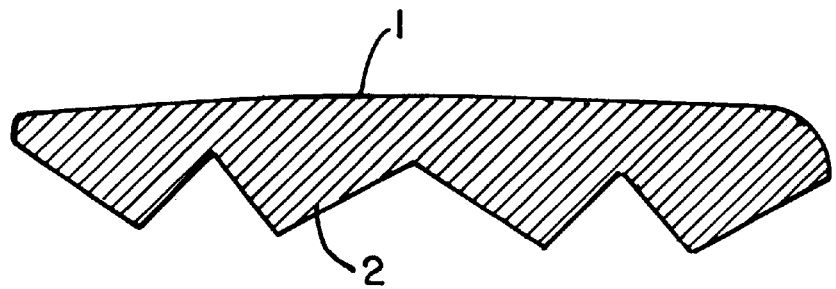
FIG. 22 is a sectional view to illustrate the third embodiment of the present invention.

The cylindrical surface (1) on the reflecting sheet may be formed such that the composite surface covers a plurality of corner-cube prisms (2) as shown in FIG. 22. In this way it is possible to form a large cylindrical surface, and this contributes to easy and accurate molding. If there is no problem with molding technique, the composite surface (1) may be formed by combination of a cylindrical surface and a flat surface, as shown in FIG. 20.

The reflecting sheet of the present invention diffuses the reflected light only in the upward direction; however, it is possible to change the diffused reflection characteristics as desired (so that the luminance of reflection is locally high) by combination of several cylindrical surfaces which differ in the curvature radius which is calculated from the above-mentioned equation.

In actual, there would be an instance where the corner-cube prism (2) cannot be molded with theoretical accuracy. In such a case, diffusion by the cylindrical surface (1) will be greater than designed and there would be some diffusion even though the plane of incidence of the corner-cube prism is flat (4).

This situation may be avoided to obtain the desired diffuse reflection characteristics, if molding errors are taken into account when the curvature radius of the cylindrical surface (1) is established or if the composite surface (1) is properly combined with the flat surface (4) as shown in FIG. 13.

Figure 18:
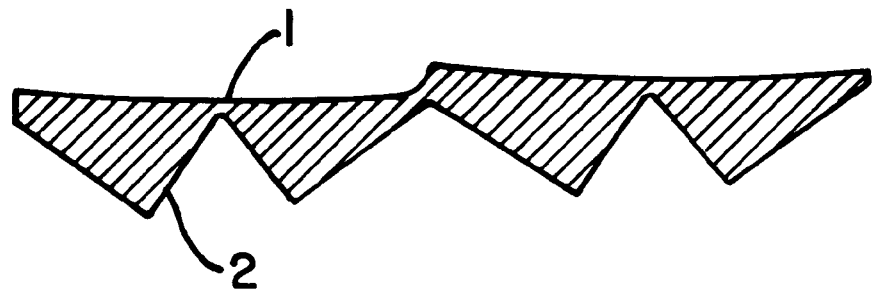
FIG. 18 is a sectional view of the third embodiment of the present invention in which the convex composite surface (1) shown in section in FIG. 16 is replaced by the concave composite surface (1).
Figure 19:
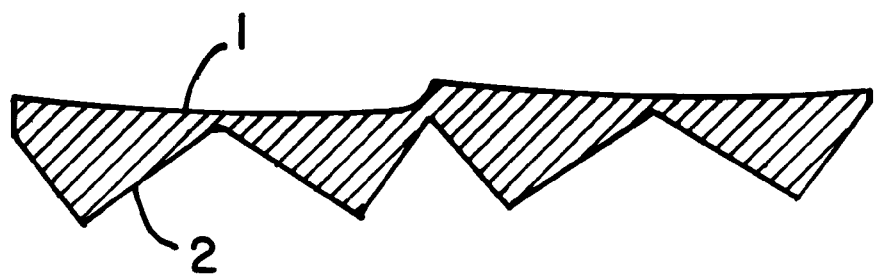
FIG. 19 is a sectional view of the third embodiment of the present invention in which the convex composite surface (1) shown in section in FIG. 17 is replaced by the concave composite surface (1).

The effect of the present invention remains the same even though the composite surface (1) is concave as shown in FIGS. 18 and 19 instead of convex, so long as the surface configuration is identical.

Figure 26:
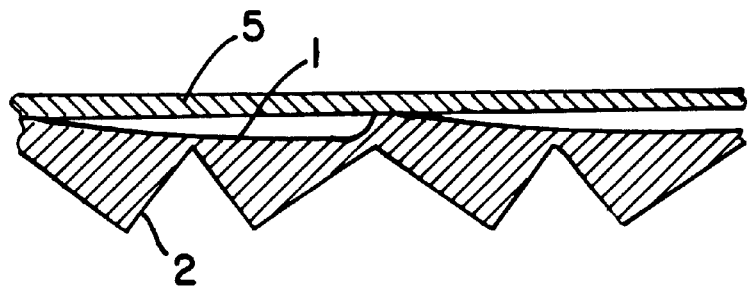
FIG. 26 is a sectional view of the third embodiment of the present invention in which the composite surface (1) is covered with a flat film (5).

The reflecting sheet with concave composite surface (1) may be covered with a transparent flat film (5) of synthetic resin which is ultrasonically bonded as shown in FIG. 26. This flat film prevents the hollow of the concave composite surface from being filled with ink when the plane of incidence is printed with a transparent ink.

Figure 16:
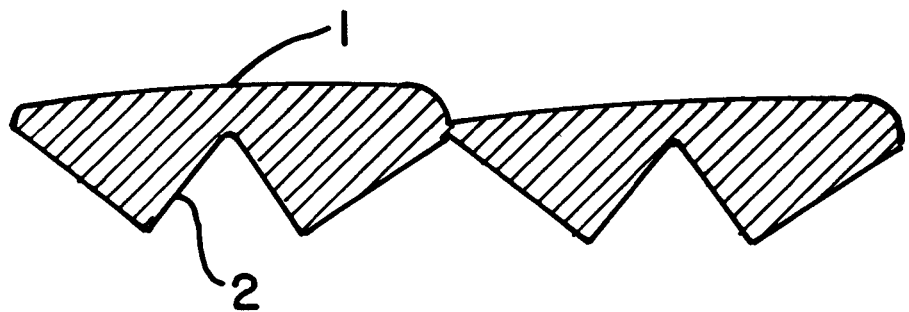
FIG. 16 is a sectional view of the third embodiment of the present invention taken along the line A–A' in FIG. 1.
Figure 17:
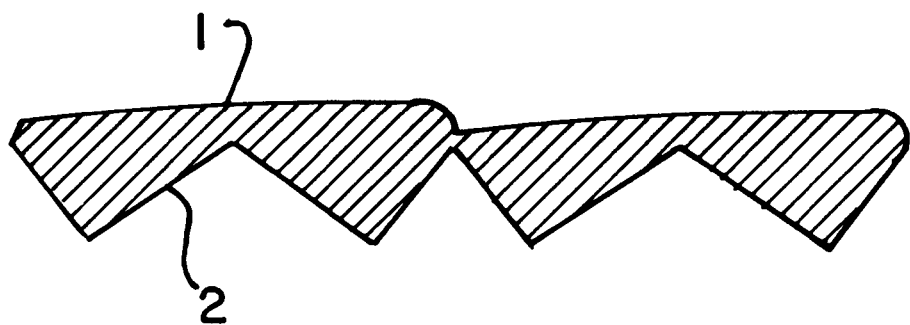
FIG. 17 is a sectional view of the third embodiment of the present invention taken along the line B–B' in FIG. 1.

In this embodiment, the composite surfaces (1) are arranged such that the slope is in the upward and downward direction and the corner-cube prisms (2) are arranged such that one angle of the regular triangle at the plane of incidence is in the upward and downward direction. There is another way of arrangement in which the composite surfaces (1) are arranged as mentioned above and the corner-cube prisms (2) are arranged such that one angle of the regular triangle at the plane of incidence is in the rightward and leftward direction, as shown in FIG. 16. The effect of the latter case is that the angle of reflection is wider for incident rays in the lateral direction on account of the optical properties of the corner-cube prisms (2).

The reflection sheet of this embodiment reflects the incident rays toward the light source with a certain ratio of diffusion which can be established as desired. Because of this optical property, the reflection sheet will find use as an indoor wall paper which reflects light from the ceiling in the upward direction only. This will produce an effect of making the entire room look bright. The reflecting sheet will find other industrial uses.

The reflection sheet of the present invention may be available in thick plate form (about 1000 μm thick) as explained below. The reflection plate is molded from transparent resin (such as polycarbonate and acrylic) or glass. It has a reflecting surface on its reverse. The face of the reflection plate is composed of contiguous composite surfaces (1). Each composite surface is a combination of a cylindrical surface having a curvature radius of 6253 μm (which is inclined downward only as viewed from front) and a curved surface (which is inclined upward only). The reverse of the reflection plate is composed of contiguous corner-cube prisms (2). Each prism has the plane of incidence which is a regular triangle having a side 1500 μm long. The composite surface (1) is formed such that the cylindrical surface accounts for a large part of its area and covers two corner-cube prisms (2) as shown in FIGS. 1 to 5. The face and reverse of the reflecting plate are integrally molded from synthetic resin.

The reflecting plate constructed as mentioned above is completed by plating its reverse with aluminum to form the reflecting surface. It is used as such as reflectors attached to the guardrail or installed in the dividing strip or cut into a proper size and pasted up or screwed up on cells.

In fixing the reflecting plate to cells, care should be taken that the slopes of the cylindrical surfaces are in the downward direction (as viewed from front), because the reflecting plate possesses the directional property for reflection.

It is possible to impart a desired color to the reflecting plate by preparing it from a dyed (or pigmented) transparent acrylic resin or other synthetic resin.

In actual, there would be an instance where the corner-cube prism (2) cannot be molded with theoretical accuracy. In such a case, diffusion by the cylindrical surface (1) will be greater than designed and there would be some diffusion even though the plane of incidence of the corner-cube prism is flat (4).

Figure 23:
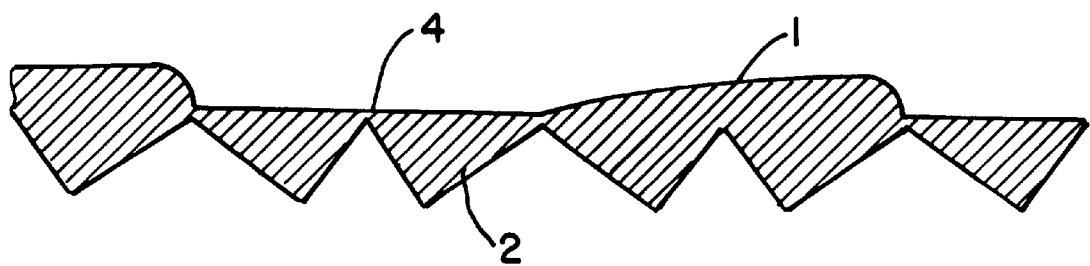
FIG. 23 is a sectional view to illustrate the plane of incidence in the third embodiment of the present invention which has a composite surface (1) and a flat surface (4) in combination.
Figure 24:
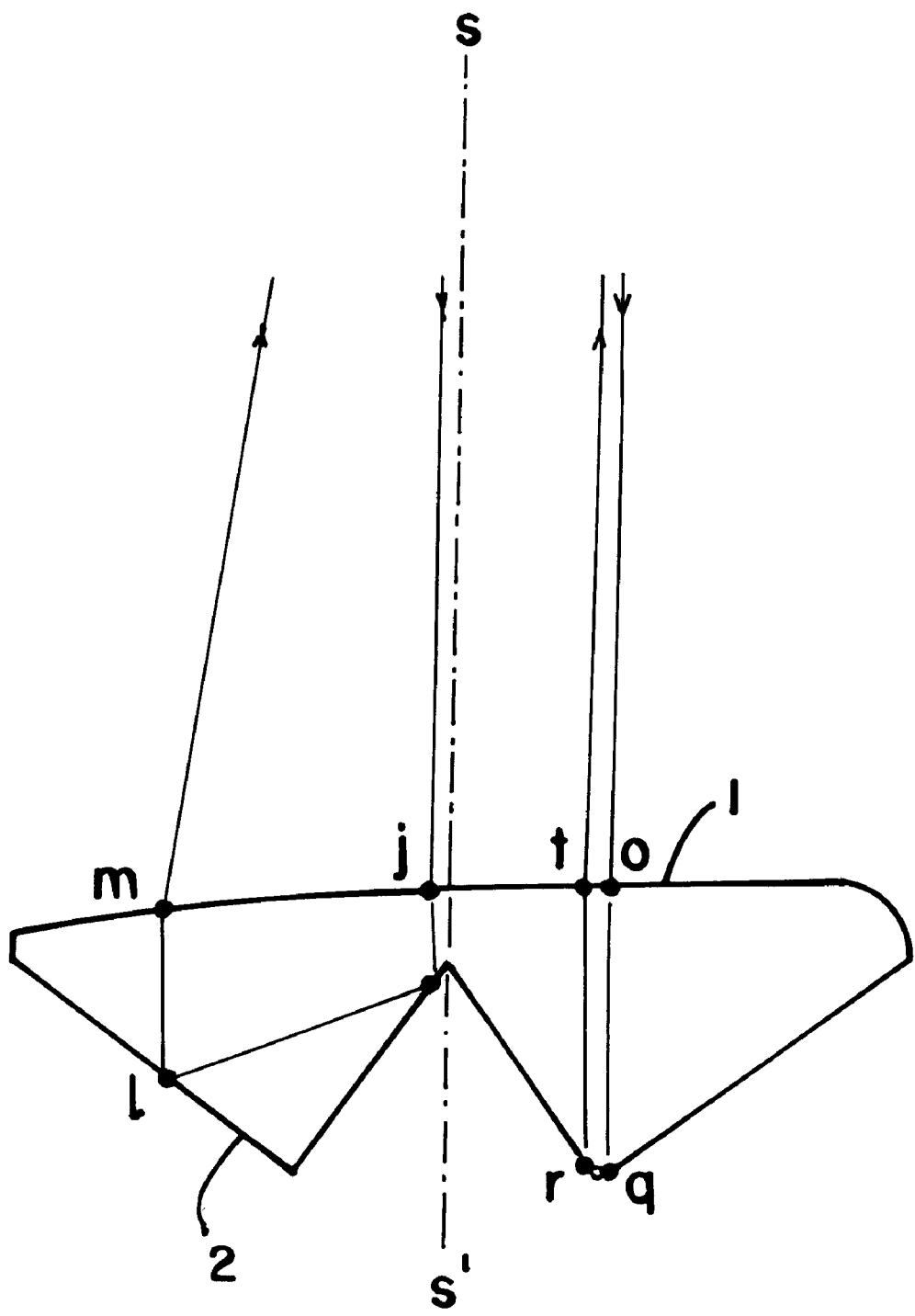
FIG. 24 is a diagram of optical paths to illustrate the effect of diffuse reflection in the third embodiment of the present invention.
Figure 25:
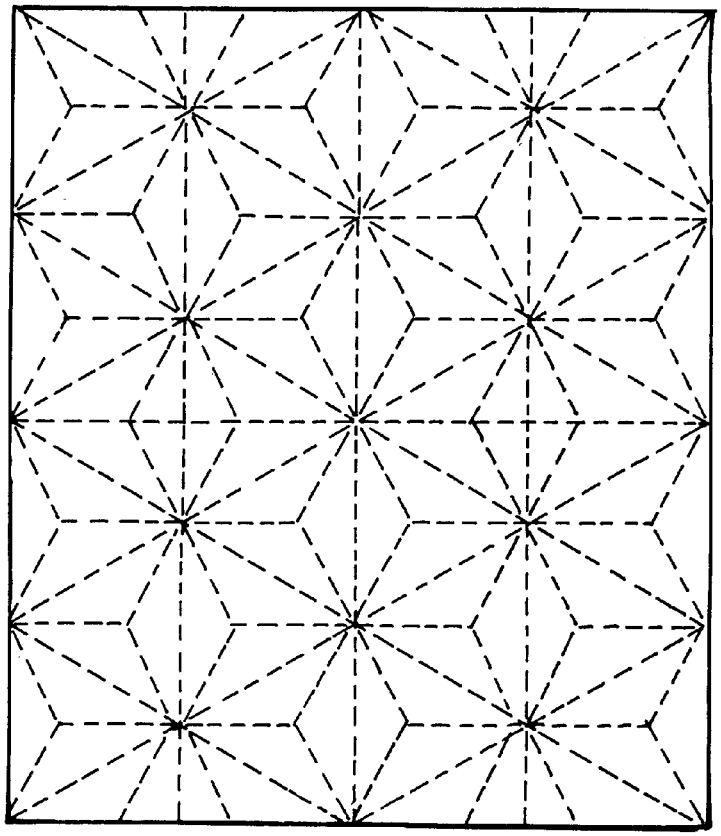
FIG. 25 is a diagram to illustrate the arrangement of corner-cube prisms (2) in the third embodiment of the present invention, said arrangement being such that one angle of the regular triangle in the incidence side is in the horizontal direction.

This situation may be avoided to obtain the desired diffuse reflection characteristics, if molding errors are taken into account when the curvature radius of the cylindrical surface is established for the composite surface (1) or if the composite surface (1) is properly combined with the flat surface (4) as shown in FIG. 23.

The effect of the present invention remains the same even though the composite surface (1) is concave as shown in FIGS. 18 and 19 instead of convex, so long as the surface configuration is identical.

Other embodiments than above will be constructed broadly within the spirit and scope of the invention as set out in the accompanying claims.

The first embodiment of the present invention produces the following effect.

The reflecting sheet reflects the incident rays in such a manner that the angle between the incident rays (from the headlight of a car or motorcycle) and the reflected rays (toward the driver) always lies in the vertical plane perpendicular to the reflecting sheet. The diffuse reflection of the reflecting sheet or reflector is satisfactory for practical use so long as its direction is normal to the reflecting sheet.

Based on this principle, the reflecting sheet of the present invention is characterized in that the highly directional reflection of corner-cube prisms (2), as the reflecting elements, is compensated by a series of cylindrical surfaces (1) in place of a series of spherical surfaces on the plane of incidence. The cylindrical surfaces direct the reflected rays only in the direction normal to the reflecting sheet and eliminate the diffuse reflection proceeding in other directions. This minimizes the loss of reflected rays which otherwise results from diffuse reflection. Therefore, the reflecting sheet of the present invention is more effective, with a higher luminance, than the conventional reflecting sheet having glass beads as the reflecting elements.

In the case of conventional reflecting sheets having glass beads or corner-cube prisms as the reflecting elements, it is physically difficult to control the luminance of reflected rays that varies from one place to another depending on the angle of reflection. However, such control is possible in the present invention by forming the plane of incidence from a combination of some kinds of cylindrical surfaces which differ in curvature radius or from a combination of cylindrical surfaces and flat surfaces.

The property of the reflecting sheet that the reflected rays proceed only in the direction normal to the plane of incidence is true not only in the case where the incident rays are normal to the reflecting sheet but also in the case where the incident rays are sideward aslant to the reflecting sheet. In the latter case, too, the reflected rays proceed only in the direction normal to the reflecting sheet. Such reflecting characteristics are ideal for practical use.

The third embodiment of the present invention produces the following effect.

The reflecting sheet reflects the incident rays in such a manner that the angle between the incident rays (from the headlight of a car or motorcycle) and the reflected rays (toward the driver) always lie in the vertical plane perpendicular to the reflecting sheet. The driver's visual point is always above the headlight of a car or motorcycle. Therefore, diffuse reflection of the reflecting sheet is satisfactory for practical use so long as its direction is slightly above the light source.

Based on this principle, the reflecting plate of the present invention is characterized in that the highly directional reflection of corner-cube prisms (2), as the reflecting elements, is compensated by a series of cylindrical surfaces (1) in place of a series of spherical surfaces on the plane of incidence. The cylindrical surfaces have their slopes oriented downward, so that the reflected light proceeds slightly upward from the light source in the vertical plane normal to the reflecting plate. This eliminate the diffuse reflection proceeding in other directions and minimizes the loss of reflected rays which otherwise results from diffuse reflection. Therefore, the reflecting plate of the present invention is more effective, with a much higher luminance, than the conventional reflecting sheet having glass beads as the reflecting elements.

The present invention solved the problem associated with conventional reflecting sheets. That is, it made it possible to greatly increase the luminance of reflected raysin the case where the angle of observation is about 2°. The result is an improved visibility of reflecting signs by the driver at a short distance. Therefore, the reflecting sheet of the present invention will greatly contribute to preventing traffic accidents at night that occur due to insufficient visibility of road signs.

I claim:

1. A reflecting sheet which comprises a transparent sheet capable of reflection by its reverse, said transparent sheet having the face which is partly or entirely constructed of a plurality of composite surfaces, each being a combination of a cylindrical surface inclined in one direction only and a curved or flat surface inclined in the opposite direction, said composite surfaces being contiguous or intermittent with a flat surface interposed between and being constructed such that a large part of their surface area is accounted for by the cylindrical surfaces, and also having the reverse which is constructed of a plurality of contiguous corner-cube prisms.

* * * * *